United States Patent [19]
Dunshee et al.

[11] 3,908,650
[45] Sept. 30, 1975

[54] ABRASION AND SOIL RESISTANT MICROPOROUS MEDICAL ADHESIVE TAPE

[75] Inventors: Wayne Keith Dunshee, Maplewood, Minn.; Clark Edward Vier, River Falls, Wis.

[73] Assignee: Minnesota Mining and Manufacturing Company, St. Paul, Minn.

[22] Filed: June 18, 1974

[21] Appl. No.: 480,421

[52] U.S. Cl. ............. 128/156; 117/68.5; 117/122 P
[51] Int. Cl.² ......................................... A61L 15/00
[58] Field of Search ............................ 128/155–157, 128/165, 169, 170; 117/68.5, 122 R, 122 P

[56] References Cited
UNITED STATES PATENTS

| | | | |
|---|---|---|---|
| 3,364,063 | 1/1968 | Satas | 128/156 X |
| 3,483,018 | 12/1969 | Waldman | 117/68.5 |
| 3,523,846 | 8/1970 | Muller | 128/156 X |
| 3,563,237 | 2/1971 | Maxwell | 128/169 |
| 3,677,788 | 7/1972 | Zirnite | 117/68.5 X |

*Primary Examiner*—Lawrence W. Trapp
*Attorney, Agent, or Firm*—Alexander, Sell, Steldt & DeLaHunt

[57] ABSTRACT

An abrasion and soil resistant microporous medical adhesive tape comprising an interlayer comprising a web of intermingled fibers, said interlayer having a porous structure capable of passing perspiration from human skin therethrough; a layer of porous pressure-sensitive adhesive which is nonirritating to human skin on one surface of said interlayer and a thermoplastic film comprising a thermoplastic which is insoluble in water on the other surface of said interlayer, said film being self-sustaining and having about five to 40 pores per square millimeter of film surface, said pores having an average area of no more than about 0.01 square millimeter and constituting about 5 to about 40 percent of the total area of said film. The fibers of the interlayer of the tape which are adjacent to the film are water repellent at least to the extent that water penetrates the fibers with difficulty.

10 Claims, 4 Drawing Figures

U.S. Patent  Sept. 30,1975  3,908,650
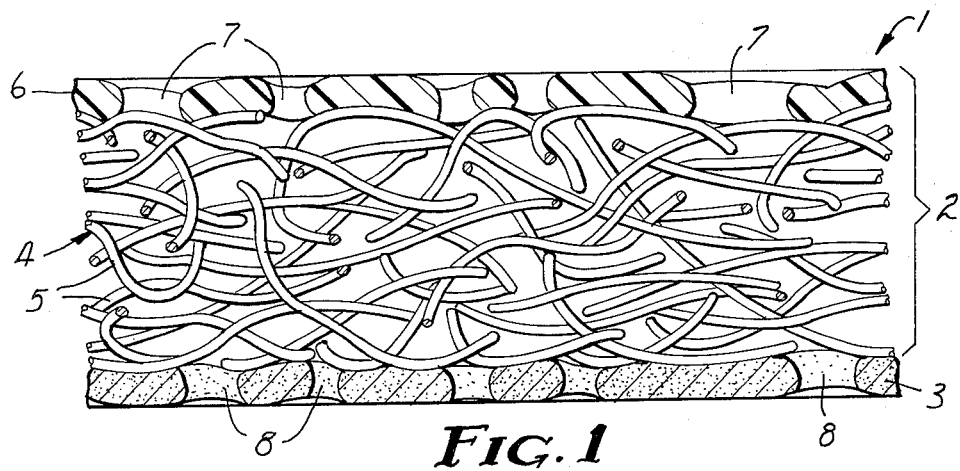
FIG. 1
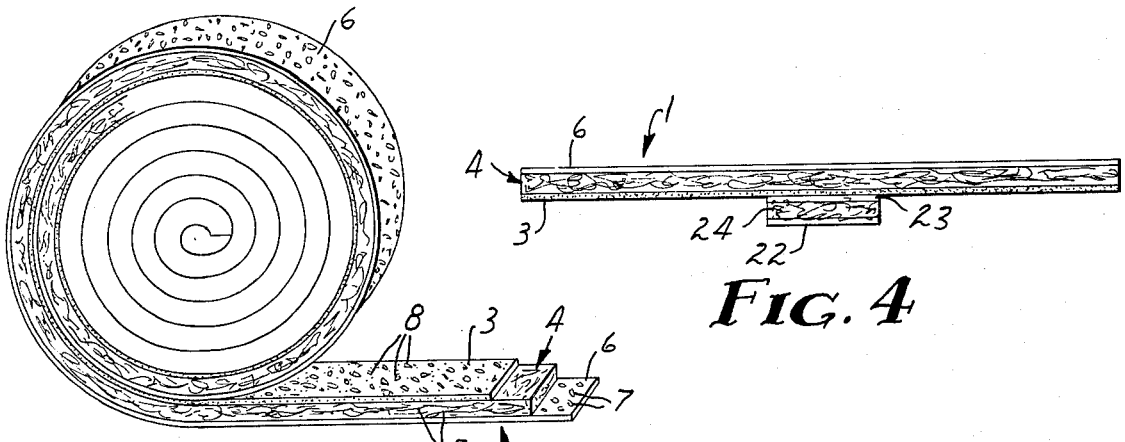
FIG. 2
FIG. 4
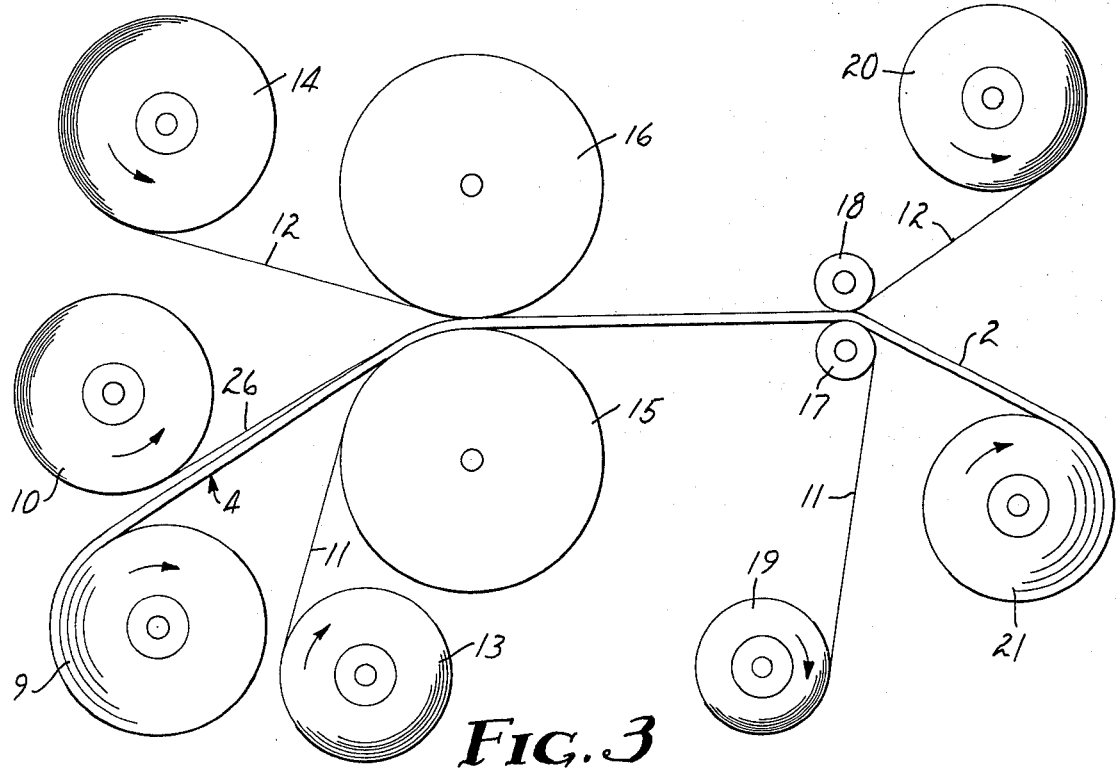
FIG. 3

ABRASION AND SOIL RESISTANT MICROPOROUS MEDICAL ADHESIVE TAPE

This invention relates to microporous medical adhesive tapes. In particular, this invention relates to soil and abrasion resistant microporous medical adhesive tapes.

Adhesive tapes for medical use which are microporous are known, U.S. Pat. No. 3,121,021. The advantage of such tapes is that their porosity allows for penetration of air to the wound surface. Thus, rapid healing is promoted for air causes eschar formation. Furthermore, such tapes, because of their porosity, do not macerate the skin under the tape in nonwound areas for moisture is not trapped under the tape and because air can penetrate the tape. ("Maceation" is a condition of the skin induced by prolonged contact with an adhesive tape whereby the skin becomes soft, wrinkled and white due to the inability of the skin to breathe and to eliminate perspiration and also due to it being shielded from air and light). Such tapes have found widespread acceptance. Microporous tapes, however, due to their structure, tend to abrade and soil in some uses.

Wound healing is promoted if the same tape is allowed to remain on the wound for the entire healing process. Removing the tape during the healing process causes the eschar to be removed, thus, placing the dermal cells which are growing under the eschar to be placed in a hostile environment and to dry out. Healing must commence again.

Normally, tapes or bandages are removed prior to healing because they have been abraded and/or have become soiled. Thus, they are not cosmetically pleasing. A tape was sought which would be soil and abrasion resistant yet microporous so as to provide the advantages of the aforesaid microporous tape. Previous tapes have not fulfilled this need for they either lack sufficient porosity as is the case with tapes with a number of macropores punched in the backing thereof, or are not abrasion and soil resistant because while they are porous their surface is absorbent and fibrous.

A tape has been found which is abrasion and soil resistant yet microporous. It is an abrasion and soil resistant microporous medical adhesive tape comprising an interlayer comprising a web of intermingled fibers, said interlayer having a porous structure capable of passing perspiration from human skin therethrough; a layer of porous pressure-sensitive adhesive which is non-irritating to human skin on one surface of said interlayer and a thermoplastic film comprising a thermoplastic which is insoluble in water on the other surface of said interlayer, said film being self-sustaining and having about five to 40 pores per square millimeter of film surface, said pores having an average area of no more than about 0.01 square millimeter and constituting about 5 to about 40 percent of the total area of said film; the fibers of said interlayer which are adjacent to said film being water repellent at least to the extent that water penetrates the fibers with difficulty.

The invention is described in more detail below with reference to the drawings in which FIG. 1 illustrates an enlarged cross-sectional view of the tape of this invention;

FIG. 2 is a roll of the tape of the present invention with portions cut away;

FIG. 3 illustrates the process for preparing the backing of the tape of the present invention; and FIG. 4 is a side elevational view of a bandage made from the tape of the present invention.

Referring specifically to FIG. 1, the tape 1 comprises backing 2 and pressure-sensitive adhesive 3 with pores 8. Backing 2 is comprised of interlayer 4 comprising a web of intermingled fibers 5 and thermoplastic film 6 containing pores 7. In FIG. 2, depicting a roll of the tape of the present invention, the pressure-sensitive adhesive 3, interlayer 4 and thermoplastic film 6 are shown.

The interlayer 4 is comprised of a web of intermingled fibers 5 and has a porous structure which is capable of passing perspiration from human skin therethrough. The fibers 5 of the interlayer 4 which are adjacent to film 6 must be water repellent at least to the extent that water penetrates the fibers with difficulty. The fibers can, however, be capable of being wetted on their surface upon prolonged contact with water. This, along with the film 6, permits the surface of the tape which is exposed, i.e., the film surface to resist penetration of liquids thus rendering it soil resistant.

The fibers can obtain their water repellency from their inherent structure or through a sizing and/or bonding of them. In particular, the interlayer can be a nonwoven web of synthetic fibers such as polyester, rayon, and/or nylon. The web of these fibers is prepared using known procedures such as described in U.S. Pat. No. 3,121,021. The web is bonded with a suitable polymeric material such as latex of ethylene/ acetate copolymer. This sizes or coats the fibers sufficiently so that the fibers which are adjacent to the thermoplastic film are of sufficient water repellency. The fibers of the interlayer can be wood pulp which are sized or mixtures of wood fibers and synthetic fibers such as those noted above, e.g., a sized mixture 50 to 60 percent by weight wood fibers and 40 to 50 percent by weight rayon and hemp fibers. The interlayer can be woven fabrics which would be normally sized at least on the surface thereof so as to impart sufficient water repellency to the fibers adjacent to the film.

If the interlayer is a woven web of fibers and if the fibers inherently have sufficient water repellency, no sizing or bonding agent need be used. However, if a nonwoven web of fiber is used the fibers are bonded together in order to give the interlayer structural integrity. If the fibers have sufficient water repellency inherently or are sized fibers, the fibers of the web can be bonded by heat or spunbonding or by using a bonding agent such as previously described. Fibers which are spun or heatbonded can have their water repellency increased by the use of a sizing material. The amount of material used will depend on the type of fiber and sizing agent. If the fibers of the web are not inherently sufficiently water repellent and are not previously sized, the sizing and bonding can be done by using a bonding agent such as previously described, i.e., ethylene/acetate copolymer latex ("Elvace"1968, E. I. du Pont de Nemours and Company, Wilmington, Del.) or other binder-sizing materials such as water-dispersible rubbery acrylate-polymer latices which dry on fibers to a nontacky state. These are well known. An example is "Rhoplex B-15", sold by Rohm and Haas Company, an aqueous dispersion containing about 46 percent acrylic polymer solids by weight and which is diluted with water to provide a sizing and bonding bath having a polymeric solids concentration of about 28 percent. The concentration is adjusted so that the weight of the polymeric sizing and bonding material on a dry basis is about 30 to 90 percent, preferably 50 to 80 percent of the total interlayer weight. The above percentage applies when other binders or sizing agents are used. The amount used depends on the type of fibers and the type of binder.

Generally the interlayer of the tape of the present invention is 0.050 mm to 0.50 mm thick if it is a nonwoven web and 0.10 to 1.1 mm thick if it is a woven web.

The interlayer of the tapes of the present invention can be extensible or inextensible. A preferred extensible interlayer is one which is made of polyester fibers approximately 40 millimeters long and 1.5 deniers which are made into a nonwoven web on a Garnett Carding Machine, model 74C-120, Procter and Schwartz, Inc., Philadelphia, Pa., or a Rando-Webber Machine, Curlator, Inc., East Rochester, N.Y., or the like. The web is bonded with Elvace 1968, the ethylene/acetate copolymer latex noted above. The binder on a dry weight is normally from 60 to 75 percent by weight of the bonded web.

The film 6 is any flexible thermoplastic film which comprises a thermoplastic which is substantially insoluble in water such as plasticized vinyl chloride/vinyl acetate copolymers, ethylene/vinyl acetate copolymers, polyurethane, polyethylene, polypropylene, plasticized polyvinyl chloride and ionically crosslinked polymers of $\alpha$-olefins and $\alpha, \beta$ ethylenically unsaturated carboxylic acids such as those described in U.S. Pat. No. 3,264,272. A preferred thermoplastic film is made of polyurethane. In particular a polyurethane with the trademark "Tuftane" TF110 sold by B. F. Goodrich Chemical Company, 3135 Euclid Ave., Cleveland, Ohio. Normally the thermoplastic film is 0.5 to 2 mils (0.01 to 0.5 mm) in thickness.

The thermoplastic film is rendered porous during the lamination of the film 6 to the interlayer 4. It is believed that this occurs when the film in the heated condition stretches over a void in the interlayer. Generally there are five to 40 pores per square millimeter of film surface, preferably about eight to 15 pores. The pores have an average area of no more than about 0.01 square millimeter and constitute about 5 to about 40 percent of the total area of the film. The film must be of a sufficient porosity to not significantly hinder the microporous effect achievable by the porous interlayer, i.e., the ability of air to contact the skin and the ability to remove perspiration therefrom but must be sufficiently nonporous in order to render it abrasion and soil resistant.

The adhesive 3 is any nonirritating type adhesive such as the acrylates and polyurethane adhesives, U.S. Pat. No. 3,796,678. The presently preferred pressure-sensitive adhesive is a pure rubbery copolymer of iso-octyl acrylate and acrylic acid in 94:6 ratio by weight;; this type being described in Ulrich's U.S. Pat. No. 2,884,126 (Apr. 28, 1959 now U.S. Pat. No. Re. 24,906). The pores 8 in adhesive 3 develop when the adhesive is applied to the interlayer 4 and film 6 laminate.

The preparation of interlayer 4/film 6 laminate will be described by reference to FIG. 3. Interlayer 4 is unreeled from reel 9. Film 26 is unwound from reel 10. Film 26 and interlayer 4 contact each other as well as release liners 11, 12 being unwound from reels 13 and 14, respectively, at nip rolls 15, 16, at least nip roll 16 is heated to from 340° to 360°F. The pressure applied at the nip rolls is normally 30 pounds per square inch gauge (1,550 mm Hg) and the velocity of the backing 2 prepared in the process is 20 to 25 feet (6.1 to 7.6 m) per minute. The heat and pressure at the nip rolls 15 and 16 cause the film 26 to be laminated to the interlayer 4 and cause the pores in the film to be produced. The backing 2 with the release liners 11, 12 then passes while cooling to rools 17,18 where the release liners 11, 12 are removed, release liner 11 being wound on roll 19 and release liner 12 being wound on roll 20. The backing 2 is wound on roll 21.

After the backing is formed, the adhesive is attached to it. With the acrylate-type adhesive, the original solvent dispersion thereof is coated on a heated drum from which the dried polymer is removed and redispersed in a mixed solvent of heptane and isopropyl alcohol (70:30) to provide a 22 percent solution of coatable viscosity or if tackifier is included in the adhesive, to provide a 32 percent solution. This procedure eliminates volatile ingredients of the original polymer solution.

The adhesive solution is coated on a moving liner having an insoluble, heat-resistant, shiny-smooth, antistick surface (such as a paper liner carrying a silicone resin release coating) in a wet coating weight adequate to provide a dry adhesive weight of about 54 grams/-square meter. This adhesive is promptly drawn into and through a hot air heating oven so arranged that after initial drying of the adhesive to a semi-dry state, the above-described backing is layed down on the adhesive and becomes adhesively laminated thereto on the non-film surface. An air temperature of 100°–150°F. is preferably employed. Too high a temperature will cause a spongy adhesive coating or make control difficult. The objective at this point is to partially dry the adhesive to a degree that will prevent wicking through the superimposed porous backing fabric and yet retain enough solvent in the adhesive coating to develop the desired microporous structure after lamination. The degree of porosity that is developed is roughly inversely proportional to the heating interval in this stage. The optimum time for any heating interval in any given set of equipment must be determined by trial-and-error, as it is dependent upon the oven arrangement and operating conditions. Adjustment can be made by varying the rate of travel of the backing and adhesive. Continuing through the drying oven, the laminated "sandwich" of the adhesive and backing is further heated to develop the microporous adhesive structure and then to fully eliminate residual solvent and thereby complete the drying.

The adhesive can be applied dry, that is, with all solvent removed by heating the adhesive while pressing it against the backing.

In order for the tape of the present invention to have the requisite porosity and soil and abrasion resistance, it should have a Gurley densometer gas permeability of less than about 1,500 seconds per 300 cubic centimeters of air, preferably less than 500 seconds per 300 cubic centimeters of air, most preferably less than 100 seconds per 300 cubic centimeters of air. The liquid permeability of the tape, a measure of soil resistance, should be on the film side of the tape greater than 50 seconds with both water and "Nujol" mineral oil, preferably greater than 120 seconds, most preferably greater than 300 seconds. The film surface of the tape is normally sufficiently abrasion resistant to show no wear at 15 cycles, preferably no wear after 25 cycles, most preferably 50 cycles. All the test procedures for the above tests are set forth below.

The soil and abrasion resistance of the tape of the present invention is due to the film which resists abrasion and to the absence of fibers extending from the tape on the film surface. In use, of course, the film surface of the tape would be away from the skin. Although the film is porous, it does not readily allow for penetration of liquids into the interlayer of the tape for the fibers of the interlayer of the tape adjacent of the film are water repellent as above defined. Thus, liquids are not drawn into the interlayer and soiling is prevented. Furthermore, there is a substantial void of fibers from the interlayer extending to or through the film outer surface. The tape remains sufficiently porous, however, because of its porous adhesive, interlayer and film to allow air to contact the skin under the tape and to allow for removal of perspiration therefrom.

The tape of the present invention can be used in itself as a tape to mend wounds, for normal medical adhesive tape purposes, or it can be used as the adhesive tape portion of a bandage.

One type of bandage is shown in FIG. 4. The bandage comprises tape 1 comprising adhesive layer 3, and backing 2 comprising interlayer 4 and film 6, all as described above. In the embodiment shown, the absorbent compress portion of the bandage comprises porous polyethylene films 22 and 23 with a nonwoven web 24 of rayon fibers between them. Release liner (not shown) would be attached to the exposed adhesive portion of the tape. This particular type of absorbent wound dressing is described in U.S. Pat. No. 3,285,245. Other wound dressings can, of course, be used for the compress portion of the bandage.

The following examples are meant to illustrate but not to limit the invention. All parts and percentages are by weight unless otherwise specified. The procedures for the tests, the results of which are given in the examples, are detailed below.

Abrasion resistance was determined using the following procedure: an Eberbach Lab, shaker Model 6000 with a 1½ inch (3.81 cm) reciprocating stroke was used with a weighted probe having a cellulose sponge on the end thereof. The speed of the shaker was 1.25 cycles per second and the pressure applied to the sample was 5 pounds per square inch (259 mm Hg). A specimen which was 1 inch (2.54 cm) by 3 inches (7.62 cm) was cut and placed so that the film surface thereof was in contact with the probe of the shaker. The shaker was run for varying numbers of cycles and the abrasion on the sample was determined.

Liquid permeability was determined by cutting a test specimen 2 inches (5.08 cm) by 4 inches (10.16 cm). One drop of liquid [water or Nujol extra heavy mineral oil (Plough, Inc., Memphis, Tenn.] from a medicine dropper (0.05 cubic centimeters per drop) was placed on the specimen. The time necessary for the drop to penetrate the specimen was measured.

The contact angle measurements were made by placing one drop of water or Nujol mineral oil (0.05 cc per drop) on a test specimen which was 2 inches (5.08 cm) by 2 inches (5.08cm). At the same time light was projected on the drop with a 110 volt light source (American Optical, Model 370, Buffalo, N.Y.) and the angle measured using a Leitz Wetzlab measuring device from Leitz Optical, Germany. The contact angle $\theta$ was calculated using the following formula:

$$\operatorname{TAN} \frac{\theta}{2} = 2 \times \frac{\text{HEIGHT OF DROP}}{\text{BASE OF DROP}}$$

Gas permeability was determined on a Gurley densometer, Model 4110 TL 1441, W & L. E. Gurley, Troy, N.Y. A test specimen 2 inches (5.08 cm) by 2 inches (5.08 cm) was cut and placed on the test area in the densometer. Three hundred cubic centimeters (cc) of air was forced through 1 square inch (6.45 square centimeters) of the test specimen. The time required in seconds of time was the gas permeability.

Tensile strength and elongation at break was determined following A. S. T. M. D1682 on an Instron tensile tester Model TM, Instron Corporation, Canton, Mass. A 1 inch (2.54 cm) by 10 inches (25.4 cm) sample was cut and its tensile strength and elongation in the cross machine direction were tested. The distance between the jaws in the tester was 1 inch (2.54 cm), the cross head speed was 12 inches per minute (0.51 cm per second), the chart speed was 12 inches per minute (0.51 cm per second), and the load range was 100 ounces, full scale (2,835 grams).

EXAMPLE 1

A 12 pound per ream (20.4 grams/m²) nonwoven web of 1½ inch (3.81 centimeters), 1½ denier, type 400 Celanese polyester fibers (100 percent ethylene glycol terephthalate) (Celanese Fiber Company, Charlotte, N.C.) was prepared on a Garnett Carding Machine, Model 74C-120 (Procter and Schwartz, Inc., Philadelphia, Pa.). During its preparation the web was bonded with 12 pounds per ream (dry weight) (20.4 grams/m²) of ethylene/acetate copolymer binder as a 30 percent emulsion (Elvace 1968, E. I. du Pont de Nemours and Company, Wilmington, Del.), are then rebonded with 20 pounds per ream (dry weight) (33.9 grams/m²) of Elvace 1968 as a 30 percent by weight emulsion. The bonded web was then laminated with a ¾ mil (19.05 micron) film of polyethylene using a clothes iron at 350°F. One portion of the resulting backing was wet laminated on the surface of the backing opposite to that attached to the film following the procedure described in U.S. Pat. No. 3,131,031, above detailed, with 0.84 grams per 154.8 square centimeters of acrylate adhesive which was a pure rubbery copolymer of isooctyl acrylate-acrylic acid in a 94:6 ratio tackified by the addition of 40 percent of a highly stabilized ester resin tackifier (commercially available from Hercules Chemical Company, Wilmington, Del., under the trade name "Foral 85") by weight. The resulting tape and backing were tested using the procedures described above. The results were as follows:

| | |
|---|---|
| Tensile strength (backing) | 87 ounces/in. width (2466 grams per 2.54 centimeters width) |
| Elongation (backing) | 65% |
| Liquid permeability (backing) | |
| "Nujol" mineral oil | 120 seconds |
| Water | >600 seconds |
| | |
| Gas permeability (backing) | 0.6 seconds/300 cc of air |

| | -Continued |
|---|---|
| (tape) | 17 seconds/300 cc of air |
| Contact Angle (backing) | |
| "Nujol" mineral oil | 18° |
| Water | 90° |
| Abrasion resistance (tape) | |
| 50 cycles | no wear |
| 75 cycles | very slight wear |
| 100 cycles | noticeable wear |

EXAMPLE 2

A 12 pound per ream (20.4 grams/m$^2$) nonwoven web of 1½ inches (3.81 centimeters), 1½ denier, type 400 Celanese polyester fibers was prepared as in Example 1. The web was bonded with 32 pounds (dry weight) per ream (54.3 grams/m$^2$) of ethylene/acetate copolymer binder as an emulsion (Elvace 1968) as in Example 1. The bonded web was then laminated with 38.1 micron film of polyurethane (Tuftane TF 110, B. F. Goodrich Chemical Company, Cleveland, Ohio) using a clothes iron at 350°F. A portion of the resulting backing was wet laminated on the surface of the backing opposite to that attached to the film as in Example 1 with 0.84 grams per 154.8 square centimeters of the acrylate adhesive of Example 1. The backing and tape were tested as in Example 1. The results were as follows:

| Tensile Strength (backing) | 97 ounces/in. width |
|---|---|
| | (2750 grams/2.54 centimeters) |
| (tape) | 100 ounces/in. width |
| | (2835 grams/2.54 centimeters) |
| Elongation (backing) | 75% |
| (tape) | 85% |
| Liquid permeability (backing) | |
| "Nujol" mineral oil | 300 seconds |
| Water | >600 seconds |
| (tape) | |
| "Nujol" mineral oil | >600 seconds |
| Water | >600 seconds |

| Gas permeability (backing) | 0.6 seconds/300 cc |
|---|---|
| (tape) | 16 seconds/300 cc |
| Contact angle (backing) | |
| "Nujol" mineral oil | 20° |
| Water | 65° |
| (tape) | |
| "Nujol" mineral oil | 40° |
| Water | 72° |
| Abrasion resistance (tape) | |
| 100 cycles | no wear |

EXAMPLE 3

A 12 pound per ream (20.4 grams/m$^2$) web of 3.81 centimeters, 1½ denier type 400 Celanese polyester fibers bonded with 19 pounds (dry weight) per ream (32.2 grams/m$^2$) of ethylene/acetate copolymer binder as an emulsion (Elvace 1968) as in Example 1 (12 pounds per ream initially and 7 pounds per ream during rebonding), was laminated with 38.1 micron film of polyurethane (Tuftane TF 110) using the machining process described previously at a temperature of 340°F., pressure of 30 pounds per square inch, and a speed of 5 feet per minute. A portion of the backing was wet laminated with adhesive as in Example 1. The backing and tape were tested as in Example 1. The results were as follows:

| Tensile strength (backing) | 3056 grams/2.54 cm width |
|---|---|
| Elongation (backing) | 82% |

| | -Continued |
|---|---|
| Liquid permeability (tape) | |
| "Nujol" mineral oil | >600 seconds |
| Water | >600 seconds |
| Gas permeability (backing) | 0.6 seconds per 300 cc of air |
| Abrasion resistance (tape) | |
| 25 cycles | no wear |
| 50 cycles | extreme wear |

EXAMPLE 4

Chicopee Mills 830 white print cloth, [64 by 56 threads per inch (2.54 centimeters)] (Chicopee Mills, 1450 Broadway, Inc., New York, N.Y.) was bonded with 6.1 kilograms (dry weight) per ream (23.1 grams/m$^2$) of an ethylene/acetate copolymer binder as an emulsion (Elvace 1968) (10 percent emulsion). The bonded cloth was laminated with a 38.1 micron film of polyurethane (Tuftane TF 110) using a clothes iron at 350°F. The resulting backing was then dry laminated on the surface opposite to that to which the film was attached with 0.71 grams per 154.8 square centimeters of the acrylate adhesive of Example 1 without the Foral 85 in its dry form by heating the acrylate adhesive with a clothes iron at 350°F. The resulting tape was tested following the procedure set forth above with the following results:

| Gas permeability | 4.7 seconds per 300 cc. |
|---|---|
| Liquid permeability | |
| "Nujol" mineral oil | >600 seconds |
| Water | >600 seconds |
| Contact angle | |
| "Nujol" mineral oil | 30.4 |
| Water | 82.7 |
| Abrasion resistance | |
| 50 cycles | minimal wear |

We claim:

1. An abrasion and soil resistant microporous medical adhesive tape comprising an interlayer comprising a web of intermingled fibers, said interlayer having a porous structure capable of passing perspiration from human skin therethrough; a layer of porous pressure-sensitive adhesive which is nonirritating to human skin on one surface of said interlayer; and a thermoplastic film comprising a thermoplastic which is insoluble in water heat bonded to the other surface of said interlayer, said film being self-sustaining and having about five to 40 pores per square millimeter of film surface, said pores having an average area of no more than about 0.01 square millimeter and constituting about 5 to about 40 percent of the total area of said film; the fibers of said interlayer which are adjacent to said film being water repellent at least to the extent that water penetrates the fibers with difficulty.

2. The tape of claim 1 which has a Gurley densometer porosity of less than 1,500 seconds per 300 cubic centimeters of air.

3. The tape of claim 2 wherein said interlayer comprises a nonwoven web of polyester fibers bonded with a bonding agent.

4. The tape of claim 3 wherein said thermoplastic film comprises polyurethane.

5. The tape of claim 4 wherein said bonding agent is an ethylene/acetate copolymer and is present in said interlayer at from 60 to 75 percent by weight of the total weight of the interlayer.

6. A medical bandage comprising an adhesive tape of claim 5 with a compress attached to a portion of the adhesive surface of said tape.

7. The tape of claim 2 wherein said interlayer comprises a nonwoven web of rayon fibers bonded with a bonding agent.

8. The tape of claim 7 wherein said thermoplastic film comprises polyurethane.

9. The tape of claim 8 wherein said bonding agent is a rubbery acrylate polymer.

10. A medical bandage comprising an adhesive tape of claim 1 with a compress attached to a portion of the adhesive surface of said tape.

* * * * *